(12) United States Patent
Disteldorf et al.

(10) Patent No.: US 7,592,068 B2
(45) Date of Patent: *Sep. 22, 2009

(54) HEAT TREATABLE COATED ARTICLE WITH ZIRCONIUM SILICON OXYNITRIDE LAYER(S) AND METHODS OF MAKING SAME

(75) Inventors: Bernd Disteldorf, Mettlach (DE); Anton Dietrich, Fontnas (CH); Ratchaneekorn Chonlamaitri, Ypsilanti, MI (US)

(73) Assignees: Centre Luxembourgeois de Recherches pour le Verre et la Ceramique S.A. (C.R.V.C.), Grand Duche de Luxembourg (LU); Guardian Industries Corp., Auburn Hills, MI (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/037,453

(22) Filed: Jan. 19, 2005

(65) Prior Publication Data

US 2006/0159933 A1    Jul. 20, 2006

(51) Int. Cl.
*B32B 17/06* (2006.01)
(52) U.S. Cl. .................... 428/432; 428/698; 428/469; 428/701; 428/702
(58) Field of Classification Search ............... None
See application file for complete search history.

(56) References Cited

U.S. PATENT DOCUMENTS

| | | | |
|---|---|---|---|
| 5,199,979 A | 4/1993 | Lin et al. | |
| 5,552,180 A | 9/1996 | Finley et al. | |
| 5,688,585 A | 11/1997 | Lingle et al. | |
| 6,106,605 A | 8/2000 | Basil et al. | |
| 6,291,867 B1 | 9/2001 | Wallace et al. | |
| 6,440,592 B1 | 8/2002 | Meyer et al. | |
| 6,495,251 B1 | 12/2002 | Marietti et al. | |
| 6,576,349 B2 | 6/2003 | Lingle et al. | |
| 6,586,102 B1 | 7/2003 | Stachowiak | |
| 6,589,658 B1 | 7/2003 | Stachowiak | |

(Continued)

FOREIGN PATENT DOCUMENTS

EP    0 279 550    8/1988

(Continued)

OTHER PUBLICATIONS

U.S. Appl. No. 11/004,225, filed Dec. 6, 2004.

(Continued)

*Primary Examiner*—Ling Xu
(74) *Attorney, Agent, or Firm*—Nixon & Vanderhye P.C.

(57) ABSTRACT

A coated article is provided so as to include a solar control coating having an infrared (IR) reflecting layer sandwiched between at least a pair of dielectric layers. The IR reflecting layer may be of or include $NbZrO_x$, NbZr, NiCr, $NiCrN_x$, or the like in certain embodiments of this invention. In particular, a zirconium silicon oxynitride (e.g., $ZrSiO_xN_y$) inclusive layer is provided which unexpectedly improves blocking (reflecting and/or absorption) of UV radiation in a manner which does not significantly degrade other optical properties of a coated article. Moreover, the $ZrSiO_xN_y$ also has been found to improve (lower) the $\Delta E^*$ value upon heat treatment, thereby permitting a coated article when heat treated (HT) to more closely match its non-HT counterpart with respect to glass side reflective color after such HT.

23 Claims, 2 Drawing Sheets

U.S. PATENT DOCUMENTS

| | | |
|---|---|---|
| 6,632,491 B1 | 10/2003 | Thomsen et al. |
| 6,686,050 B2 | 2/2004 | Lingle et al. |
| 6,716,532 B2 | 4/2004 | Neuman et al. |
| 6,749,941 B2 | 6/2004 | Lingle |
| 6,802,943 B2 | 10/2004 | Stachowiak |
| 6,808,606 B2 | 10/2004 | Thomsen et al. |
| 6,908,679 B2 | 6/2005 | Stachowiak et al. |
| 7,153,578 B2 * | 12/2006 | Chonlamaitri et al. ...... 428/428 |
| 2003/0031879 A1 | 2/2003 | Neuman et al. |
| 2003/0170466 A1 * | 9/2003 | Stachowiak ................. 428/432 |
| 2004/0005467 A1 | 1/2004 | Neuman et al. |
| 2004/0137234 A1 | 7/2004 | Stachowiak |
| 2004/0161616 A1 | 8/2004 | Neuman et al. |
| 2004/0166328 A1 | 8/2004 | Stachowiak |
| 2004/0197574 A1 | 10/2004 | Stachowiak |
| 2004/0214012 A1 | 10/2004 | Stachowiak |
| 2004/0214013 A1 | 10/2004 | Stachowiak et al. |
| 2004/0224167 A1 | 11/2004 | Stachowiak |
| 2007/0036986 A1 | 2/2007 | Chonlamaitri et al. |

FOREIGN PATENT DOCUMENTS

| | | |
|---|---|---|
| EP | 0 501 632 | 9/1992 |
| EP | 0 747 329 | 12/1996 |

OTHER PUBLICATIONS

International Search Report dated Jun. 30, 2006.

* cited by examiner

US 7,592,068 B2

HEAT TREATABLE COATED ARTICLE WITH ZIRCONIUM SILICON OXYNITRIDE LAYER(S) AND METHODS OF MAKING SAME

This application is related to U.S. Ser. No. 11/004,225, filed Dec. 6, 2004, the disclosure of which is hereby incorporated herein by reference.

This invention relates to coated articles that may optionally be heat treated. In certain example embodiments, at least one layer of or including zirconium silicon oxynitride is provided. Such coated articles may be used in the context of monolithic windows, insulating glass (IG) window units, laminated windows, and/or other suitable applications.

BACKGROUND AND SUMMARY OF THE INVENTION

Solar control coatings having a layer stack of glass/$Si_3N_4$/NiCr/$Si_3N_4$ are known, where the metallic NiCr layer is the sole infrared (IR) reflecting layer in the coating. In certain instances, the NiCr layer may be nitrided. For example, see U.S. Pat. No. 5,688,585. Unfortunately, while such layer stacks with NiCr IR reflecting layers provide efficient solar control and are overall good coatings, they sometimes are lacking in terms of: (a) corrosion resistance to acid (e.g., HCl boil); (b) mechanical performance such as scratch resistance; and/or (c) color stability upon heat treatment for tempering, heat bending, or the like (i.e., too high of $\Delta E^*$ value(s)). For example, a known heat treatable coated article having a layer stack of glass/$Si_3N_4$/NiCr/$Si_3N_4$ has rather high glass side reflective $\Delta E^*$ value above 5.0 after heat treatment (HT) at 625 degrees C. for about ten minutes. This high glass side reflective $\Delta E^*$ value means that the coated article when HT will not approximately match its non-HT counterpart with respect to glass side reflective color after such HT.

A recent development by one of the current inventors, set forth in U.S. 2004/0214013 (hereby incorporated herein by reference), is the use of a layer stack of glass/$Si_3N_4$/$NbZrO_x$/$Si_3N_4$, where the $NbZrO_x$ is used as the IR reflecting layer in the coating. This layer stack is advantageous with respect to the aforesaid glass/$Si_3N_4$/NiCr/$Si_3N_4$ layer stack in that coated articles with the $NbZrO_x$ IR reflecting layer realize improved color stability upon heat treatment (i.e., lower $\Delta E^*$ values) and/or improved durability.

While coated articles having a layer stack of glass/$Si_3N_4$/$NbZrO_x$/$Si_3N_4$ represent improvements in the art, it would be desirable in certain example instances if even lower $\Delta E^*$ values could be achieved.

Furthermore, solar control coatings such as those mentioned above often do not block significant amounts of ultraviolet (UV) radiation. In other words, such coatings typically provide only moderate or negligible UV protection, since the materials used in the layer stacks are transparent for short wavelengths (e.g., below 400 nm). Thus, even when such coatings are provided on windows such as IG windows or the like, significant amounts of UV radiation makes its way through the window and into the building or other interior space. UV radiation is penetration tends to damage furniture and other elements inside of buildings or the like.

Materials such as vanadium oxide and cerium oxide absorb significant amounts of UV radiation. However, while such materials are characterized by a very steep onset of absorption for UV radiation, the onset of radiation absorption occurs in significant part in the visible part of the spectrum thereby leading to a significant distortion of colors when look through such a coating (e.g., a yellow shift). Accordingly, viewing characteristics tend to be degraded when layers of such materials are used.

In view of the above, it will be appreciated that there exists a need in the art for a coated article including a solar control coating which is capable of blocking at some UV radiation in an efficient manner. Certain example embodiments of this invention relate to a coated article which permits significant UV absorption properties to be achieved.

In certain example embodiments of this invention, it has surprisingly been found that the provision of a layer consisting essentially of, or comprising, zirconium silicon oxynitride (e.g., $ZrSiO_xN_y$) unexpectedly improves blocking (reflecting and/or absorption) of UV radiation in a manner which does not significantly degrade other optical properties of a coated article such as visible transmission and/or color. Moreover, as an added unexpected advantage, it has surprisingly been found that the provision of a layer(s) of zirconium silicon oxynitride (e.g., $ZrSiO_xN_y$) unexpectedly improves (lowers) $\Delta E^*$ values upon heat treatment, thereby permitting a coated article when heat treated (HT) to more closely match its non-HT counterpart with respect to glass side reflective color after such HT.

In certain example embodiments of this invention, a layer of zirconium silicon oxynitride may be tuned in a manner so as to achieve a desired amount of UV blocking and/or absorption. It has been found that zirconium silicon oxynitride has optical constants (n and k) which allow adjustment of the onset of absorption by varying oxygen content of the layer for example. Moreover, it has been found that zirconium silicon oxynitride has a refractive index (n) in a range which is very adaptable to solar control coatings, so that such layer(s) may be used in solar control coatings without significantly changing the visible appearance of the coated article or certain performance data. Thus, in certain example embodiments of this invention, the absorption edge of the curve defined by a layer of zirconium silicon oxynitride can be adjusted by changing the oxygen content thereof, which may be done for example by adjusting the amount of oxygen introduced into the sputtering chamber(s) during reactive sputter-deposition of the layer. In particular, for example, as oxygen content of the layer increases, the absorption edge of the curve defined by the layer of zirconium silicon oxynitride moves toward lower wavelengths away from certain visible wavelengths. Thus, in certain example embodiments, a balancing or tuning can be performed so as to achieve a desired balance between visible transmission and UV absorption.

In certain example embodiments of this invention, there is provided a coated article for use in a window and including a coating supported by a substrate, the coating comprising: an infrared (IR) reflecting layer; and a layer comprising zirconium silicon oxynitride located over at least the IR reflecting layer. In certain example embodiments of this invention, the IR reflecting layer comprises one or more of: (a) an oxide of niobium zirconium; (b) a nitride of niobium zirconium; (c) a nitride of nickel chromium; (d) substantially metallic nickel chromium; and (e) niobium.

In other example embodiments, there is provided a coated article including a coating supported by a glass substrate, the coating comprising: a first dielectric layer; an infrared (IR) reflecting layer located on the substrate over at least the first dielectric layer; and a layer comprising zirconium silicon oxynitride located on the substrate over at least the IR reflecting layer and the first dielectric layer.

IN THE DRAWINGS

DETAILED DESCRIPTION OF CERTAIN EXAMPLE EMBODIMENTS OF THE INVENTION

Certain embodiments of this invention provide coated articles that may be used in windows such as monolithic windows (e.g., vehicle, residential, and/or architectural windows), IG window units, and/or other suitable applications. Certain example embodiments of this invention provide a layer system that is characterized by at least one of: (a) good corrosion resistance to acids, and alkaline solutions such as NaOH; (b) good thermal performance such as blocking of significant amounts of IR and/or UV radiation; (c) good mechanical performance such as scratch resistance; and/or (d) good color stability upon heat treatment (i.e., low $\Delta E^*$ value(s)). With respect to color stability upon heat treatment (HT), this means a low value of $\Delta E^*$; where $\Delta$ is indicative of $a^*$, $b^*$ and $L^*$ change in view of HT such as thermal tempering, heat bending, or thermal heat strengthening, monolithically and/or in the context of dual pane environments such as IG units or laminates.

Figure 1:
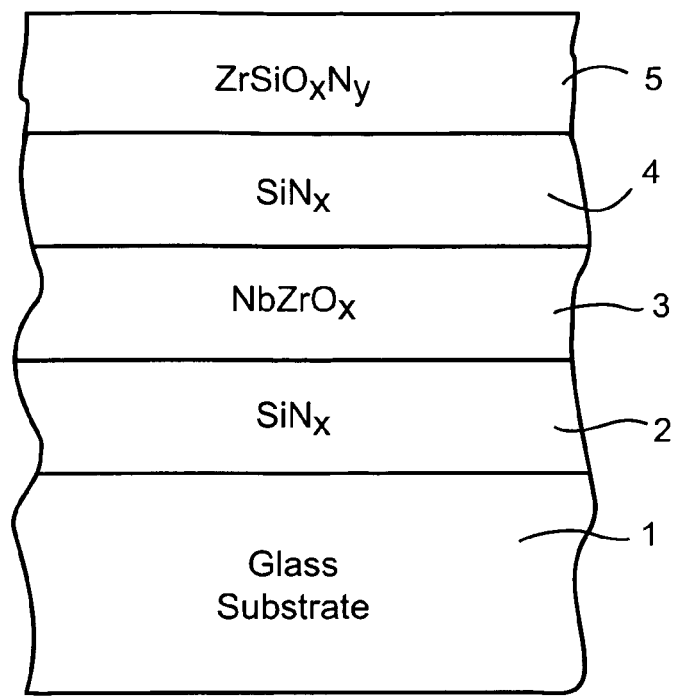
FIG. 1 is a partial cross sectional view of an embodiment of a monolithic coated article (heat treated or not heat treated) according to an example embodiment of this invention.

FIG. 1 is a side cross sectional view of a coated article according to an example embodiment of this invention. The coated article of FIG. 1 includes at least substrate 1 (e.g., clear, green, bronze, grey, blue, or blue-green glass substrate from about 1.0 to 12.0 mm thick), first optional dielectric layer 2 (e.g., of or including silicon nitride (e.g., $Si_3N_4$), tin oxide, or some other suitable dielectric such as a metal oxide and/or nitride), infrared (IR) reflecting layer 3 of or including niobium zirconium (NbZr) and/or an oxide of niobium zirconium ($NbZrO_x$), and second dielectric layer 4 (e.g., of or including silicon nitride (e.g., $Si_3N_4$), tin oxide, or some other suitable dielectric such as a metal oxide and/or nitride). In certain alternative embodiments, the bottom dielectric layer 2 may be omitted so that the IR reflecting layer 3 may be located in contact with the glass substrate. Also, it is possible to nitride the $NbZrO_x$ IR reflecting layer 3 to some extent in certain alternative embodiments of this invention. A protective overcoat 5 of or including a material such as zirconium silicon oxynitride is provided over at least layers 2-4 in certain example embodiments of this invention.

In certain example embodiments of this invention, the coating optionally may not include any metallic IR blocking or reflecting layer of Ag or Au. In certain example embodiments, NbZr and/or $NbZrO_x$ inclusive IR reflecting layer(s) 3 may be the only IR reflecting layer in the coating, although many such layers may be provided in certain instances. In certain example embodiments of this invention, NbZr and/or $NbZrO_x$ IR reflecting layer 3 reflects at least some IR radiation. In certain example embodiments, it is possible for the NbZr and/or $NbZrO_x$ layer 3 to include other materials such as dopants.

The coating illustrated in FIG. 1 includes at least layers 2-5. It is noted that the terms "oxide" and "nitride" as used herein include various stoichiometries. For example, the term silicon nitride includes stoichiometric $Si_3N_4$, as well as non-stoichiometric silicon nitride. Silicon nitride may of course be doped with Al, Zr and/or any other suitable metal. Layers 2-5 may be deposited on substrate 1 via magnetron sputtering, any other type of sputtering, or via any other suitable technique in different embodiments of this invention.

In certain example embodiments of this invention, it has surprisingly been found that the provision of a layer 5 consisting essentially of, or comprising, zirconium silicon oxynitride (e.g., $ZrSiO_xN_y$) as a dielectric layer(s) of such a coating unexpectedly improves blocking (reflecting and/or absorption) of UV radiation in a manner which does not significantly degrade other optical properties of a coated article such as visible transmission and/or color. One or more such zirconium silicon oxynitride layers may be provided in a given coating in different embodiments of this invention. Moreover, such zirconium silicon oxynitride layer(s) may be provided in any type of solar control coating in different embodiments of this invention, and the specific coatings described herein are for purposes of example only unless recited in the claim(s).

In certain example embodiments of this invention, a layer of zirconium silicon oxynitride 5 may be tuned in a manner so as to achieve a desired amount of UV blocking and/or absorption. It has been found that zirconium silicon oxynitride 5 has optical constants (n and k) which allow adjustment of the onset of absorption by varying oxygen content of the layer for example. Moreover, it has been found that zirconium silicon oxynitride has a refractive index (n) in a range which is very adaptable to solar control coatings, so that such layer(s) may be used in solar control coatings without significantly changing the visible appearance of the coated article or certain performance data. Thus, in certain example embodiments of this invention, the absorption edge of the curve defined by a layer of zirconium silicon oxynitride can be adjusted by changing the oxygen content thereof, which may be done for example by adjusting the amount of oxygen introduced into the sputtering chamber(s) during reactive sputter-deposition of the layer 5. In particular, for example, as oxygen content of the layer increases, the absorption edge of the curve defined by the layer of zirconium silicon oxynitride moves toward lower wavelengths away from certain visible wavelengths. Thus, in certain example embodiments, a balancing or tuning can be performed so as to achieve a desired balance between visible transmission and UV absorption.

In certain example embodiments of this invention, zirconium silicon oxynitride may also be used for example on top of a layer of or comprising silicon nitride as shown in FIG. 1. The use of a layer of zirconium silicon oxynitride 5 in this respect has surprisingly been found to improve chemical stability and heat stability (i.e., lower $\Delta E^*$ values), and zirconium silicon oxynitride has also been found to be stable during sputtering processing.

Figure 3:
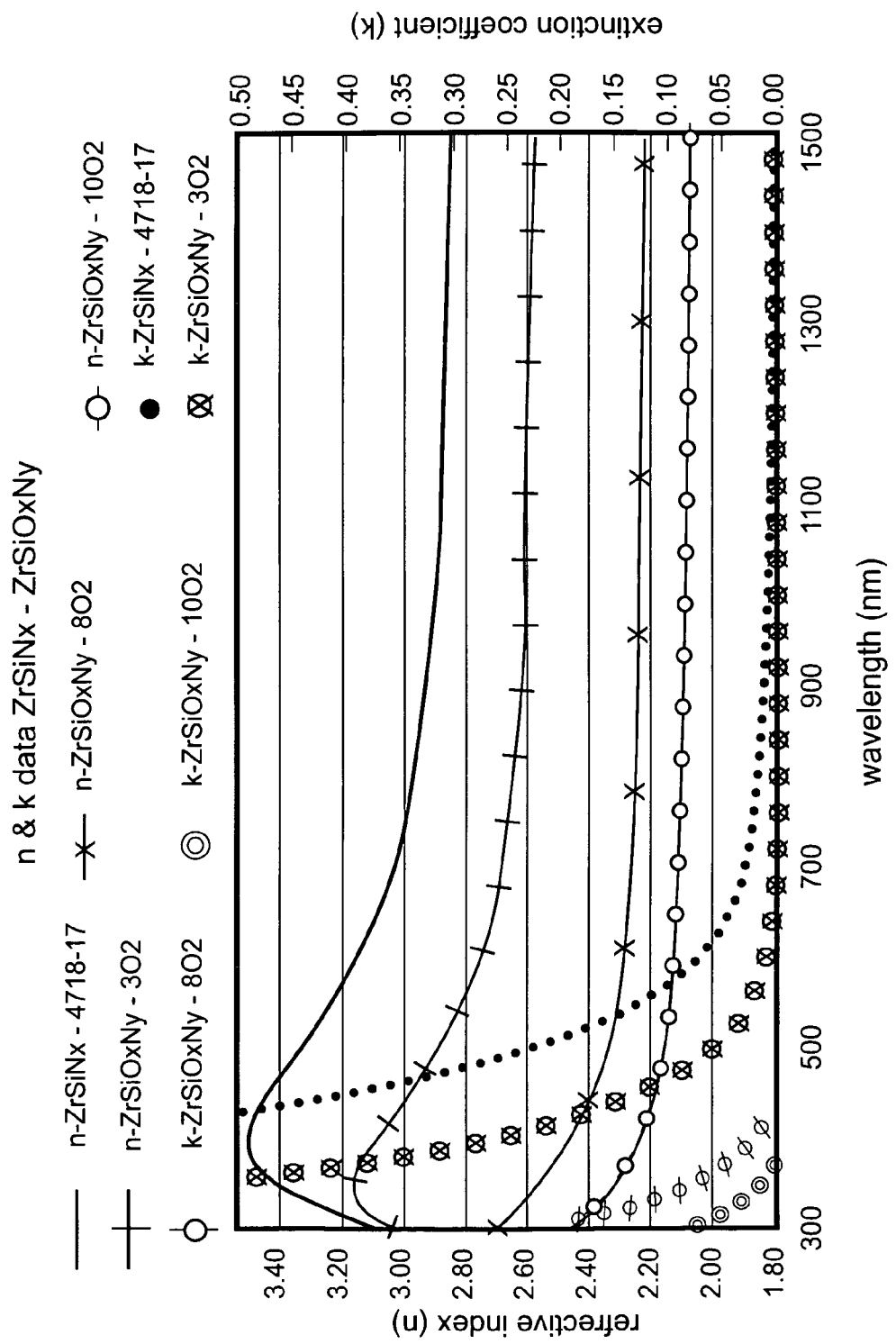
FIG. 3 is a graph illustrating n and k values for various layers according to different example embodiments of this invention where n and k are shown to vary with oxygen content of the layer.

FIG. 3 is a graph plotting optical constants, in particular refractive index (n) and extinction coefficient (k), at different wavelengths for layers according to different example embodiment of this invention, with the data being determined by ellipsometry. Four different layers are plotted, with respect to n and k, in FIG. 3. In particular, FIG. 3 plots the following four layers: (a) zirconium silicon nitride with 0 sccm oxygen gas flow in the sputter-deposition chamber; (b) zirconium silicon oxynitride with 3 sccm oxygen gas flow in the sputter-deposition chamber; (c) zirconium silicon oxynitride with 8 sccm oxygen gas flow in the sputter-deposition chamber; and (d) zirconium silicon oxynitride with 10 sccm oxygen gas flow in the sputter-deposition chamber. The thickness of each of the four layers was 205 Å, 196 Å, 180 Å and 185 Å, respectively. It can be seen that the oxygen content of the layer 5 was progressively increased from the first layer to the fourth layer. Each layer was deposited using a sputtering target including about 93% Zr and about 7% Si. In depositing each of the four layers, 40 sccm Ar gas and 55 sccm $N_2$ gas was used for flowing in the sputtering chamber, and a power of 2.5 kW was used and from about 458-489 V.

As can be seen in FIG. 3, a layer 5 of zirconium silicon oxynitride may be tuned in a manner so as to achieve a desired amount of UV blocking and/or absorption by adjusting the amount of oxygen in the layer. In particular, n and k of the layer 5 can be tuned by adjusting the amount of oxygen used in the sputtering process and thus in the layer. FIG. 3 illustrates that as oxygen content of the layer 5 increases, the absorption edge of the curve defined by the layer of zirconium silicon oxynitride moves toward lower wavelengths (UV wavelengths) and away from certain visible wavelengths. For instance, in FIG. 3 it can be seen that the refractive index (n) peak, or leading edge closest to the center visible wavelength, shifts to the left (toward lower wavelengths, away from the visible) as oxygen content increases. Moreover, it can also be seen that the leading edge of the extinction coefficient (k) curve closest to the center visible also shifts to the left (toward lower wavelengths, away from the visible) as oxygen content increases.

In certain example embodiments of this invention, the oxygen content of the zirconium silicon oxynitride layer(s) 5 is adjusted so that the zirconium silicon oxynitride inclusive layer 5 has an index of refraction (n) (at a wavelength of 550 nm) of from about 1.6 to 2.8, more preferably from about 1.7 to 2.5, and even more preferably from about 1.8 to 2.4. Moreover, the oxygen content of the zirconium silicon oxynitride layer(s) 5 is adjusted so that the zirconium silicon oxynitride inclusive layer has an extinction coefficient (k) (at a wavelength of 550 nm) of no greater than about 2.3, more preferably no greater than about 2.0, even more preferably no greater than about 1.8. Tuning of the oxygen content of the zirconium silicon oxynitride in such a manner has been found to permit good UV absorption to be achieved in combination with not significantly adversely affecting visible characteristics of the coated article. Moreover, tuning of the oxygen content in such a manner causes the zirconium silicon oxynitride to have a refractive index which is close to that of certain layers often used in solar control coatings such as oxides of Ti, Sn, Zn and/or the like. As an example, the absorption edge of a zirconium silicon oxynitride layer can be moved over a large wavelength range and may be positioned above, below, or substantially on a ZnO reference edge merely by changing the oxidation level of the layer thereby permitting it to substantially match ZnO from an optical perspective in certain example instances. Thus, such zirconium silicon oxynitride may replace part of all of such layers in solar control coatings in certain situations without significantly adversely affecting visible characteristics of the coated article. The achievable UV protection is largely dependent on the position of the absorption edge and the layer thickness required by the optical properties of the overall coating.

Moreover, in forming the zirconium silicon oxynitride layer(s) 5 according to certain example embodiments of this invention (e.g., via reactive sputtering), the ratio of nitrogen/oxygen (e.g., $N_2/O_2$) gas used in the sputter chamber is no greater than about 25, more preferably no greater than about 18, more preferably no greater than about 10. In certain example embodiments of this invention, the ratio of nitrogen/oxygen (e.g., $N_2/O_2$) gas used in the sputter chamber in forming a layer 5 of or including zirconium silicon oxynitride is from about 1 to 25, more preferably from about 2 to 18, and sometimes from about 2 to 10. Additionally, according to certain example embodiments of this invention, a zirconium silicon oxynitride layer (e.g., 5) is characterized by a ratio of nitrogen to oxygen (atomic percent) therein of from about 1 to 25, more preferably from about 2 to 18, and sometimes from about 2 to 10. Of course, other gases such as Ar may also be used in the sputtering chamber along with oxygen and nitrogen when sputter depositing a layer of zirconium silicon oxynitride. In certain example embodiments, the amount of Ar gas used in sputtering is greater than the amount of oxygen but less than the amount of nitrogen used in forming a layer of zirconium silicon oxynitride. For example, in certain example embodiments, the gas ratio used in sputter depositing a layer 5 of zirconium silicon oxynitride is 40 ml Ar, 55 ml $N_2$ and 10 ml $O_2$.

Moreover, in certain example embodiments of this invention, the peak of the refractive index curve (e.g., see FIG. 3) for a layer 5 of zirconium silicon oxynitride is at a wavelength shorter than about 400 nm, more preferably shorter than about 375 nm, and sometimes shorter than about 350 nm, and even sometimes shorter than about 300 nm.

In addition to the aforesaid advantageous optical properties, zirconium silicon oxynitride layers according to different embodiments of this invention realize good mechanical and chemical durability. Thus, such layers may be suitable for use in base coats or overcoats in solar control for example.

In certain example embodiments of this invention, the Zr/Si ratio (atomic percent) in an example zirconium silicon oxynitride layer 5 may be from about 2.0 to 50.0, more preferably from about 5.0 to 20.0, even more preferably from about 8.0 to 18.0, and most preferably from about 10.0 to 15.0 (e.g., about 13 in certain example instances). Thus, in certain example embodiments of this invention there is more Zr than Si in a layer of or including zirconium silicon oxynitride in terms of atomic percent. Moreover, in certain example embodiments, an example zirconium silicon oxynitride layer may be from about 20 to 400 Å thick, more preferably from about 40 to 300 Å thick, and even more preferably from about 50 to 250 Å thick.

As explained above, zirconium silicon oxynitride layer(s) according to different example embodiments of this invention may be used in various locations in solar control coatings. The coatings described below are provided for purposes of example.

Turning to other layers of the FIG. 1 embodiment, it has been found that the use of Zr and Nb in IR reflecting layer 3 allows the resulting coated article to realize excellent chemical and mechanical durability, and also good thermal performance. For example, the use of NbZr and/or $NbZrO_x$ in IR reflecting layer(s) 3 allows the resulting coated article(s) to achieve: (a) improved corrosion resistance to alkaline solutions such as NaOH (compared to layer stacks of glass/$Si_3N_4$/Nb/$Si_3N_4$ and glass/$Si_3N_4$/$NbN_x$/$Si_3N_4$); (b) excellent thermal performance comparable to that of Nb and $NbN_x$; (c) good mechanical performance such as scratch resistance; and/or (d) good color stability upon heat treatment (e.g., lower ΔE* value(s) than coated articles with layer stacks of glass/$Si_3N_4$/NiCr/$Si_3N_4$). It has surprisingly been found that in certain example instances, the use of NbZr instead of Nb allows for a lower ΔE* value(s).

Furthermore, in certain example $NbZrO_x$ embodiments, it has unexpectedly been found that oxiding (e.g., partial oxiding) layer 3 is particularly beneficial with respect to lowering ΔE* value(s). For example, in certain example embodiments, oxygen ($O_2$) gas flows when sputtering a NbZr target(s) may be from about 0.5 to 6 sccm/kW, more preferably from about 1 to 4 sccm/kW, and most preferably from about 2 to 3 sccm/kW (where kW is a unit of power used in sputtering). These oxygen flows, have been found to lead to significantly improved ΔE* value(s). For instance, ΔE* value(s) can be lowered even further due to oxiding the NbZr inclusive layer to form a layer comprising $NbZrO_x$, compared to non-oxided layers of NbZr and $NbZrN_x$.

Still referring to the FIG. 1 embodiment, in certain example embodiments, the Zr:Nb ratio (atomic %) in layer 3 may be from about 0.001 to 1.0, more preferably from about 0.001 to 0.60, and even more preferably from about 0.004 to 0.50, and still more preferably from 0.05 to 0.2 (e.g., 0.11). In certain example embodiments, with respect to metal content, the IR reflecting layer may include from about 0.1 to 60% Zr, more preferably from about 0.1 to 40% Zr, even more preferably from 0.1 to 20%, still more preferably from 0.1 to 15%, more preferably from about 0.4 to 15% Zr, and most preferably from 3 to 12% Zr (atomic %).

In embodiments where the IR reflecting layer 3 is of or includes $NbZrO_x$ (i.e., an oxide of NbZr) (e.g., see the FIG. 1 embodiment), the atomic ratio in the layer of oxygen to the total combination of Nb and Zr may be represented, in certain example embodiments, by $(Nb+Zr)_xO_y$, where the ratio y/x (i.e., the ratio of oxygen to Nb+Zr) is from 0.00001 to 1.0, even more preferably from 0.03 to 0.20, and still more preferably from 0.05 to 0.15. This ratio is applicable before and/or after heat treatment. Thus, it can be seen that in certain example embodiments of this invention, the NbZr inclusive layer is partially oxided, and such oxidation results in significant advantages over non-oxided versions.

While FIG. 1 illustrates that NbZr and/or $NbZrO_x$ IR reflecting layer 3 is in direct contact with dielectric layers 2 and 4, and wherein layer 3 is the only IR reflecting layer in the coating, the instant invention is not so limited. Other layer(s) may be provided between layers 2 and 3 (and/or between layers 3 and 4) in certain other embodiments of this invention. Moreover, other layer(s) (not shown) may be provided between substrate 1 and layer 2 in certain embodiments of this invention; and/or other layer(s) (not shown) may be provided on substrate 1 over layer 4 in certain embodiments of this invention. Thus, while the coating or layers thereof is/are "on" or "supported by" substrate 1 (directly or indirectly), other layer(s) may be provided therebetween. Thus, for example, the layer system and layers thereof shown in FIG. 1 are considered "on" the substrate 1 even when other layer(s) (not shown) are provided therebetween (i.e., the terms "on" and "supported by" as used herein are not limited to directly contacting). Also, more than one NbZr and/or $NbZrO_x$ IR reflecting layer may be provided in alternative embodiments of this invention.

In certain example embodiments of this invention, dielectric anti-reflection layer 2 may have an index of refraction "n" of from 1.7 to 2.7, more preferably from 1.9 to 2.5 in certain embodiments, while layer 4 may have an index of refraction "n" of from about 1.4 to 2.5, more preferably from 1.9 to 2.3. Meanwhile, layer 3 when comprising an oxide of NbZr may have an index "n" of from about 2.0 to 3.2, more preferably from 2.2 to 3.0, and most preferably from 2.4 to 2.9; and may have an extinction coefficient "k" of from 2.5 to 4.5, more preferably from 3.0 to 4.0, and most preferably from 3.3 to 3.8. In embodiments of this invention where layers 2 and/or 4 comprise silicon nitride (e.g., $Si_3N_4$), sputtering targets including Si employed to form these layers may or may not be admixed with up to 1-40% by weight aluminum, zirconium and/or stainless steel (e.g. SS#316), with about this amount then appearing in the layers so formed. Even with this amount (s) of aluminum and/or stainless steel, such layers 2 and 4 are still considered dielectric layers herein.

Figure 2:
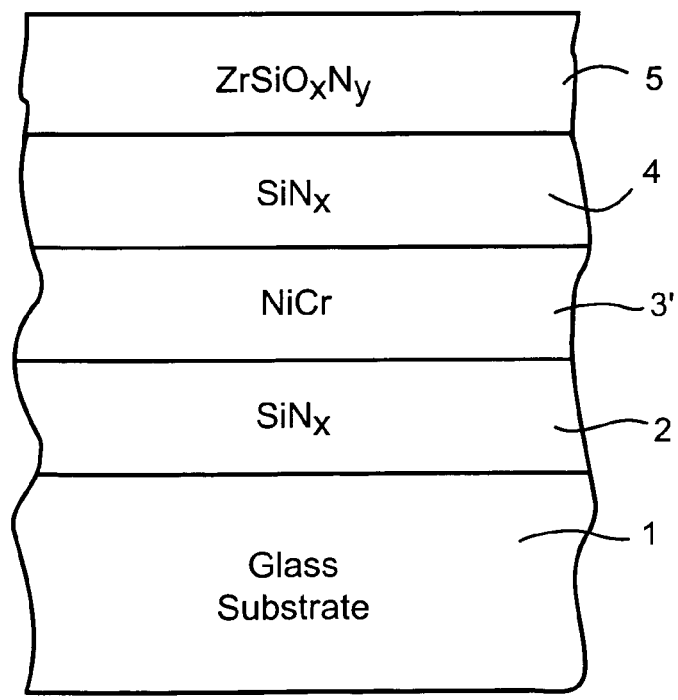
FIG. 2 is a partial cross sectional view of an embodiment of a monolithic coated article (heat treated or not heat treated) according to another example embodiment of this invention.

FIG. 2 is a cross sectional view of another example embodiment of this invention. The FIG. 2 embodiment is the same as the FIG. 1 embodiment, except that the IR reflecting layer 3' in the FIG. 2 embodiment is of a different material such as NiCr, $NiCrN_x$ or the like. For purposes of example and without limitation, other example materials which may be used for layer 3' in the FIG. 2 embodiment include Nb, $NbN_x$, $NbZrN_x$, NbCr, $NbCrN_x$, Ni, or any other suitable IR reflecting material.

While FIG. 1 illustrates a coated article according to an example embodiment of this invention in monolithic form, coated articles according to other embodiments of this invention may comprise IG (insulating glass) window units. In IG embodiments, the coating from FIG. 1 and/or 2 may be provided on the inner wall of the outer substrate of the IG unit, and/or on the inner wall of the inner substrate, or in any other suitable location in other embodiments of this invention.

Turning back to FIG. 1, various thicknesses may be used consistent with this invention. According to certain non-limiting example embodiments of this invention, example thicknesses and materials for the respective layers 2-5 on the glass substrate 1 are as follows:

TABLE 1

(Example non-limiting thicknesses)

| Layer | Example Range (Å) | Preferred (Å) | Best (Å) |
|---|---|---|---|
| silicon nitride (layer 2): | 0-1,500 Å | 20-1300 Å | 50-1200 Å |
| NbZr or $NbZrO_x$ (layer 3 or 3'): | 30-700 Å | 100-500 Å | 120-350 Å |
| silicon nitride (layer 4): | 10-900 Å | 100-800 Å | 150-500 Å |
| $ZrSiO_xN_y$ (layer 5): | 50-800 Å | 100-300 Å | 150-250 Å |

In certain exemplary embodiments, the color stability with HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The value(s) ΔE* is important in determining whether or not there is matchability, or substantial color matchability upon HT, in the context of certain embodiments of this invention (i.e., the term ΔE* is important in determining color stability upon HT). Color herein is described by reference to the conventional a*, b* values. For example, the term Δa* is indicative of how much color value a* changes due to HT. The term ΔE* (and ΔE) is well understood in the art. The definition of the term ΔE* may be found, for example, in WO 02/090281 and/or U.S. Pat. No. 6,475,626, the disclosures of which are hereby incorporated herein by reference. In particular, ΔE* corresponds to the CIE LAB Scale L*, a*, b*, and is represented by:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (or coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values $a_h$, $b_h$, $L_h$. Also within the scope of this invention and the quantification of ΔE* are the equivalent numbers if converted to those calculated by any other technique employing the same concept of ΔE* as defined above.

Before heat treatment (HT) such as thermal tempering, in certain example embodiments of this invention coated articles have color characteristics as follows in Table 2 (monolithic and/or IG unit). It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided. Table 3 set forth below illustrates certain characteristics of coated articles according to certain example embodiments of this invention after HT such as thermal tempering (monolithic and/or IG units)—the characteristics below in Table 2 (non-HT) are also applicable to HT coated articles herein, except for the additions set forth in Table 3.

TABLE 2

Color/Optical Characteristics (non-HT)

|  | General | Preferred | Most Preferred |
|---|---|---|---|
| $T_{vis}$ (TY): | 6-80% | 8-50% | 10-30% |
| $L^*_T$ | 29-92 | 34-76 | 37-62 |
| $a^*_T$ | −16 to +10 | −6 to +5 | −3 to +3 |
| $b^*_T$ | −20 to +20 | −15 to +10 | −10 to +10 |
| $R_GY$(glass side): | 6-50% | 10-40% | 10-35% |
| $L^*_G$ | 29-76 | 37-70 | 37-65 |
| $a^*_G$ | −20 to +10 | −12 to +6 | −5 to +3 |
| $b^*_G$ | −30 to +20 | −25 to +10 | −20 to +10 |
| $R_FY$(film side): | 6-50% | 6-40% | 6-37% |
| $L^*_F$ | 29-76 | 29-70 | 29-68 |
| $a^*_F$ | −20 to +20 | −10 to +10 | −5 to +5 |
| $b^*_F$ | −40 to +40 | −30 to +30 | −20 to +30 |
| $E_h$ (emissivity): | <=0.5 | <=0.4 | <=0.38 |
| $R_s$ (Ω/sq): | <250 | <100 | <60 |

TABLE 3

Color/Optical Characteristics (after HT; in addition to Table 2)

|  | General | Preferred | Most Preferred |
|---|---|---|---|
| $\Delta E^*_G$ | <=3.0 | <=1.5 | <=1.0 |
| $\Delta E^*_T$ | <=5.0 | <=3.0 | <=2.5 |
| $\Delta a^*_G$ | <=2.5 | <=1.0 | <=0.6 |
| $\Delta b^*_G$ | <=4.0 | <=1.5 | <=0.6 |
| $\Delta L^*_G$ | <=4.0 | <=2.0 | <=1.5 |

As explained herein, oxiding the NbZr inclusive IR reflecting layer to form a layer comprising $NbZrO_x$ is advantageous in that it unexpectedly allows an even lower ΔE* value to be achieved.

In certain example embodiments of this invention, the coated article may have a glass side reflective ΔE* value due to heat treatment of no greater than 4.0, more preferably no greater than 3.0, more preferably no greater than 2.5, still more preferably no greater than 2.0, even more preferably no greater than 1.5, even more preferably no greater than 1.0, and sometimes no greater than 0.8.

For purposes of example only, a plurality of examples representing different example embodiments of this invention are set forth below.

EXAMPLES

Numerous examples of coated articles having a structure of glass/$Si_3N_4$/$NbZrO_x$(or NbZr)/$Si_3N_4$, where the $NbZrO_x$ (or NbZr) is used as the IR reflecting layer, are set forth in U.S. 2004/0214013 (incorporated herein by reference). All examples in U.S. 2004/0214013 are, however, incorporated herein by reference. These examples will not be repeated herein for purposes of simplicity.

The two examples below are provided to illustrate the unexpected improvement in ΔE* values which is surprisingly achieved when a layer of zirconium silicon oxynitride is used as an overcoat layer or the like above an IR reflecting layer.

A first sample was made, including a coating on a glass substrate, so as to have a stack of glass/$Si_3N_4$/$NbZrO_x$/$Si_3N_4$/$ZrO_x$. A second sample was made so as to have a stack of glass/$Si_3N_4$/$NbZrO_x$/$Si_3N_4$/$ZrSiO_xN_y$. The bottom three layers of both samples were the same with respect to material and so forth, and only the top layer differed. The two samples were then heat treated (HT) at about 625 degrees C. for about 10 minutes. Glass side reflective L*, a* and b* values were measured both before and after the heat treatment. Surprisingly, the second sample with the $ZrSiO_xN_y$ layer had a ΔE* value of 0.6, whereas the first sample without the $ZrSiO_xN_y$ layer had a ΔE* value of 1.6. Thus, it can be seen that the use of $ZrSiO_xN_y$ instead of $ZrO_x$ as the top layer 5 of the coating unexpectedly caused the ΔE* value to drop from 1.6 to 0.6. This is, of course, highly advantageous in that it results in a heat treated coated article that more closely matches its non-heat treated counterpart with respect to glass side reflective color.

Additionally, for both samples, a HCl boil test, an NaOH boil test, and a concrete splash test were performed; and there was no sign of damage.

Certain terms are prevalently used in the glass coating art, particularly when defining the properties and solar management characteristics of coated glass. Such terms are used herein in accordance with their well known meaning. For example, see US 2004/0214013, incorporated herein by reference. For instance, the terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 or 600 degrees C. for a sufficient period to enable tempering and/or heat strengthening. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a coating supported by a glass substrate, the coating comprising:

a first dielectric layer comprising silicon nitride;

an infrared (IR) reflecting layer comprising one or more of NbZr and NiCr located on the substrate over and contacting the first dielectric layer comprising silicon nitride;

a second dielectric layer comprising silicon nitride located over and contacting the IR reflecting layer comprising, the IR reflecting layer comprising one or more of (i) an oxide of NbZr, and (ii) NiCr; and an overcoat layer comprising zirconium silicon oxynitride located on the substrate as an uppermost layer of the coating, wherein the zirconium silicon oxynitride is located over and contacts the second dielectric layer comprising silicon nitride and contains more zirconium than silicon, and wherein a Zr/Si ratio in the layer comprising zirconium silicon oxynitride is from about 5.0 to 20.0.

2. The coated article of claim 1, wherein the IR reflecting layer comprises one or more of (a) an oxide of niobium zirconium; (b) a nitride of niobium zirconium; (c) a nitride of nickel chromium; and (d) substantially metallic nickel chromium.

3. The coated article of claim 1, wherein the first dielectric layer is in direct contact with the glass substrate.

4. The coated article of claim 1, wherein the layer comprising zirconium silicon oxynitride consists essentially of zirconium silicon oxynitride.

5. The coated article of claim 1, wherein the coated article has a sheet resistance ($R_s$) of no greater than about 100 ohms/square and a visible transmission of at least about 10%.

6. The coated article of claim 1, wherein the coating comprises only one IR reflecting layer, and the one IR reflecting layer does not include silver or gold.

7. The coated article of claim 1, wherein the coated article has a visible transmission of from 8-50%.

8. The coated article of claim 1, wherein a Zr/Si ratio in the layer comprising zirconium silicon oxynitride is from about 2.0 to 50.0.

9. The coated article of claim 1, wherein a Zr/Si ratio in the layer comprising zirconium silicon oxynitride is from about 5.0 to 20.0.

10. The coated article of claim 1, wherein a Zr/Si ratio in the layer comprising zirconium silicon oxynitride is from about 10.0 to 15.0.

11. The coated article of claim 1, wherein oxygen content of the layer comprising zirconium silicon oxynitride is provided in an amount so that the layer(s) comprising zirconium silicon oxynitride at a wavelength of 550 nm has an extinction coefficient (k) of no greater than about 1.8.

12. The coated article of claim 1, wherein a ratio of nitrogen/oxygen in the zirconium silicon oxynitride is from about 1 to 25.

13. The coated article of claim 1, wherein a ratio of nitrogen/oxygen in the zirconium silicon oxynitride is from about 2 to 10.

14. The coated article of claim 1, wherein the coated article is heat treated, and wherein the coated article has a ΔE* value (glass side reflective) of no greater than 3.0 due to heat treatment.

15. The coated article of claim 1, wherein the coated article is heat treated, and wherein the coated article has a ΔE* value (glass side reflective) of no greater than 1.5 due to heat treatment.

16. The coated article of claim 1, wherein the coated article is heat treated, and wherein the coated article has a ΔE* value (glass side reflective) of no greater than 0.8 due to heat treatment.

17. The coated article of claim 1, wherein the IR reflecting layer comprises an oxide of niobium zirconium, and comprises from 0.05 to 10% oxygen.

18. The coated article of claim 1, wherein the IR reflecting layer comprises an oxide of niobium zirconium, and wherein the layer comprising the oxide of niobium zirconium comprises $(Nb+Zr)_xO_y$, where the ratio y/x (i.e., the ratio of oxygen to Nb+Zr) is from 0.03 to 0.20.

19. The coated article of claim 1, wherein the coated article is a window.

20. A coated article for use in a window and including a coating supported by a substrate, the coating comprising:

an infrared (IR) reflecting layer; and a layer comprising zirconium silicon oxynitride located on the substrate over at least the IR reflecting layer, wherein a Zr/Si ratio in the layer comprising zirconium silicon oxynitride is from about 5.0 to 20.0.

21. The coated article of claim 20, wherein the IR reflecting layer comprises one or more of: (a) an oxide of niobium zirconium; (b) a nitride of niobium zirconium; (c) a nitride of nickel chromium; (d) substantially metallic nickel chromium; and (e) niobium.

22. The coated article of claim 20, wherein the Zr/Si ratio in the layer comprising zirconium silicon oxynitride is from about 8.0 to 18.0.

23. The coated article of claim 20, wherein the Zr/Si ratio in the layer comprising zirconium silicon oxynitride is from about 10.0 to 15.0.

* * * * *